United States Patent [19]

Ohmori

[11] Patent Number: 5,538,210
[45] Date of Patent: Jul. 23, 1996

[54] FASTENER FOR FIXING LONGITUDINAL MEMBERS

[75] Inventor: Norio Ohmori, Nakashima-gun, Japan

[73] Assignee: Toyoda Gosei Co., Ltd., Japan

[21] Appl. No.: 295,014

[22] Filed: Aug. 24, 1994

[30] Foreign Application Priority Data

Aug. 25, 1993 [JP] Japan .................. 5-210629

[51] Int. Cl.⁶ ........................................ F16L 3/13
[52] U.S. Cl. ............... 248/71; 248/222.12; 403/399; 403/397; 403/389
[58] Field of Search ................... 403/397, 398, 403/399, 389, 405.1, 407.1, 406.1; 24/453, 297; 248/71, 73, 74.2, 221.4, 27.3; 411/508, 509, 510

[56] References Cited

U.S. PATENT DOCUMENTS

| | | | |
|---|---|---|---|
| 2,974,703 | 3/1961 | Rapata | 248/73 X |
| 4,644,614 | 2/1987 | Mizusawa | 24/297 X |
| 4,865,505 | 9/1989 | Okada | 411/508 x |
| 4,890,805 | 1/1990 | Morita | 248/74.2 |
| 4,901,204 | 2/1990 | Hayashi | 24/453 X |

FOREIGN PATENT DOCUMENTS 55089808  12/1953  Japan .

Primary Examiner—Anthony Knight
Attorney, Agent, or Firm—Cushman Darby & Cushman

[57]  ABSTRACT

A fastener for providing a firm ability to resist a force occurring during installation of a longitudinal article to the fastener. The fastener comprises a main body, a holding portion which projects from the main body, and a clip portion which collectively provide three points of contact within a mounting hole in a retainer plate.

7 Claims, 5 Drawing Sheets

FASTENER FOR FIXING LONGITUDINAL MEMBERS

BACKGROUND OF THE INVENTION

1. Field of the Invention

The present invention relates to a fastener for securing longitudinal members such as hoses, tubes, cables and wire harnesses. The present invention is particularly suitable for use in fastening a vacuum hose to an automobile body.

2. Description of Related Art

In the manufacture of automobiles, there are many applications for fasteners that can hold a longitudinal member. (See, for example, Japanese Utility Model Laid-open publication No. Sho 55-89808.)

Also, FIGS. 10 and 11 show a conventional fastener. A plate 31 is shown projecting from the body of an automobile. The plate 31 has a hole 32. A vacuum hose 34 is fixed on the plate 31 through a fastener 33.

The fastener 33 has a main body 35 which has an L-shaped side view, a pair of nip arms 36, and a clip portion 37.

Nip arms 36 are integrally formed with the main body 35 at one end portion, such as the upper side shown in FIG. 10. Then, nip arms 36 are formed to have substantially arcuate shape therebetween, similar in shape and dimension to the outer circumference of the vacuum hose 34 to be secured. To be able to nip and firmly hold the vacuum hose 34, the hose will be forced between arms 36. Also, clip portion 37 is formed at another end portion, such as on the lower side in FIG. 10. Clip portion 37 projects from the main body 35 to the left side in FIG. 10.

As shown in FIG. 11, clip portion 37 is formed with an anchor shape when viewed in cross-section. Clip portion 37 has a center pillar 38, integrally formed with the main body 35, and a pair of flexible retainers or members 39 which extend like a wing from the top end portion of the center pillar 38 to both the right and left sides, respectively. In this case, the space between top portions of each flexible member 39 is wider than the width of the hole 32 of plate 31. Also, each top portion of the flexible member 39 is formed with a stepped concavity. Therefore, these top portions become hooked portions 40, respectively.

In accordance with a manner of installation of above vacuum hose 34, clip portion 37 of fastener 33 is first put into the hole 32. During installation of clip portion 37, as the width of the hole 32 is narrower than the space between top portions of each flexible member 39, both flexible members 39 are bent inwardly, respectively. After clip portion 37 is put into the hole 32, both flexible members 39 return to their original condition due to elasticity of the material. Each hooked portion 40 of the flexible members 39 connects to the circumferential edge of the hole 32, respectively. Therefore, once clip portion 37 is put into the hole 32, fastener 33 is fixed on the plate 31. Then, the vacuum hose 34 is held between nip arms 36, and is installed on fastener 33. Consequently, the vacuum hose 34 is fixed on the plate 31 through fastener 33.

However, conventional fasteners, such as fastener 33, are fixed on plate 31 with the only connection being between the flexible members 39 of clip portion 37, and the circumferential edge of the hole 32 in the left-right direction. When fastener 33 receives a force F, as indicated by arrow in FIG. 10, fastener 33 does not have sufficient supporting means to resist against force F. Namely, force F can occur from the installation of the longitudinal member, such as vacuum hose 34, and force F makes clip portion 37 swing in a front-to-back direction. Therefore, during installation of vacuum hose 34, and when fastener 33 receives the above mentioned force F, fastener 33 may be unsteady. Also, according to circumstances, clip portion 37 can fall out of hole 32, and consequently, off the plate 31.

SUMMARY OF THE INVENTION

The present invention has been developed to overcome the above described problems.

An object of the present invention is to provide a fastener for fixing longitudinal members. Such a fastener has a clip portion, to be put into a hole of a fixing member or mounting plate, but the fastener will resist forces resulting during installation of longitudinal members. The present invention establishes multi-point contact the with mounting plate hole so that a more secure fastener is achieved.

Another object of the present invention is to provide a fastener which is able to provide sufficient fixing stability, for example, during installation of longitudinal members.

In accordance with the invention, these objects are achieved by a fastener having a main body, a holding portion, which projects from the main body designed for holding a longitudinal member, and a clip portion. The clip portion projects from the main body so it can be put into a hole on a mounting plate. The clip portion can have a pair of flexible holders or arms, which have a first connected portion for connecting the circumferential edge of the hole at the top end portion respectively, and a central support member which has a second connected portion for connecting the circumferential edge of the hole at the top end portion of it.

The hole in the mounting plate is preferably oval in shape, and has at least an upper curved circumferential edge. Then, each flexible holder of the clip portion is formed to the curved outer side surface. When the clip portion is put into the hole, the clip portion can automatically slide and move downwardly in accordance with the sliding of the flexible holders or retainers along the upper curved circumferential edge of the hole. Consequently, there will be no need to move the fastener downwardly. After the clip portion is put into the hole, the connected portion of the central support member will contact the lower curved circumferential edge of the hole automatically.

Other objects, features, and characteristics of the present invention, as well as the methods and operation and functions of the related elements of the structure, will become apparent upon consideration of the following description and the appended claims with reference to the accompanying drawings, all of which form a part of this specification, wherein like reference numerals designate corresponding parts in the various figures.

DETAILED DESCRIPTION OF THE PRESENTLY PREFERRED EXEMPLARY EMBODIMENT

Preferred exemplary embodiment of the present invention will now be described referring to the accompanying FIGS. 1 to 9.

Figure 2:
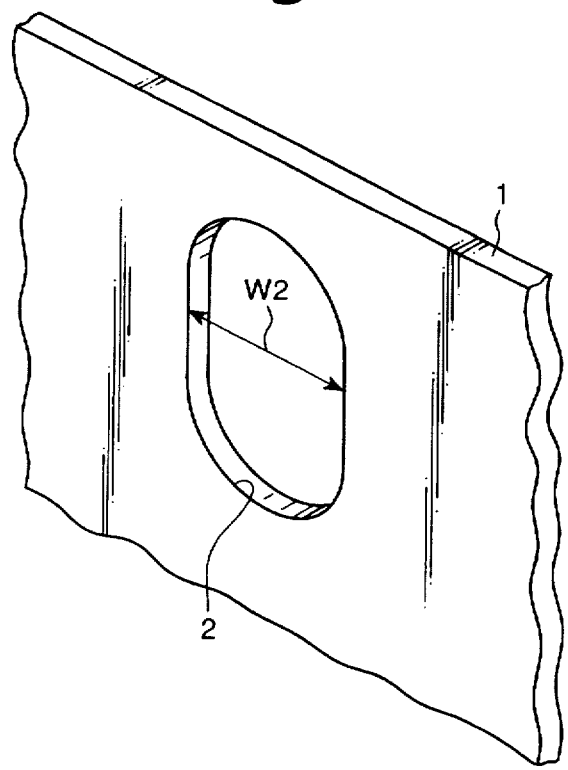
FIG. 2 is a partial perspective view showing a fixing plate in which the clamp of the present invention is fixed.
Figure 3:
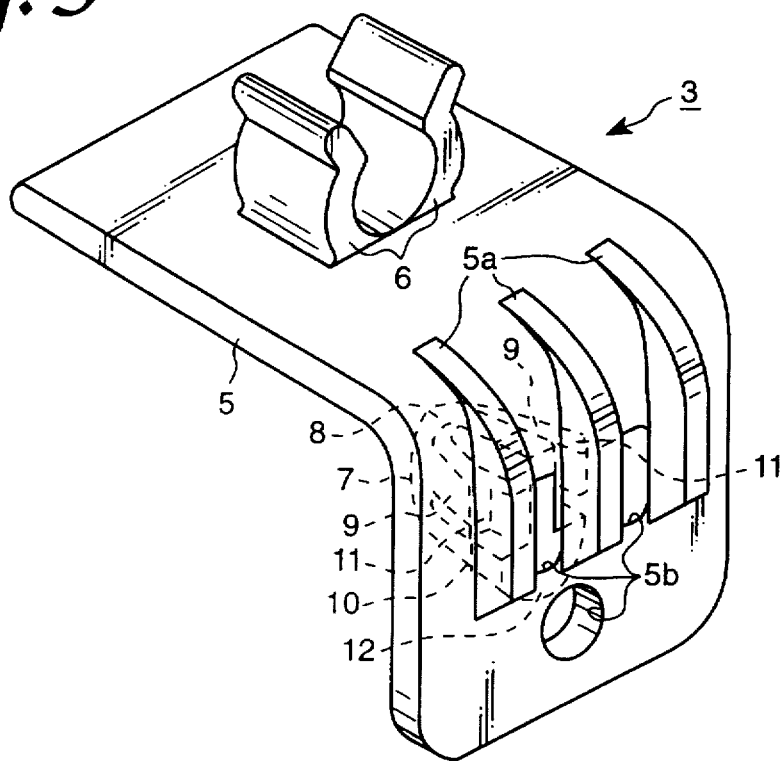
FIG. 3 is a perspective view showing the clamp of the present invention.
Figure 4:
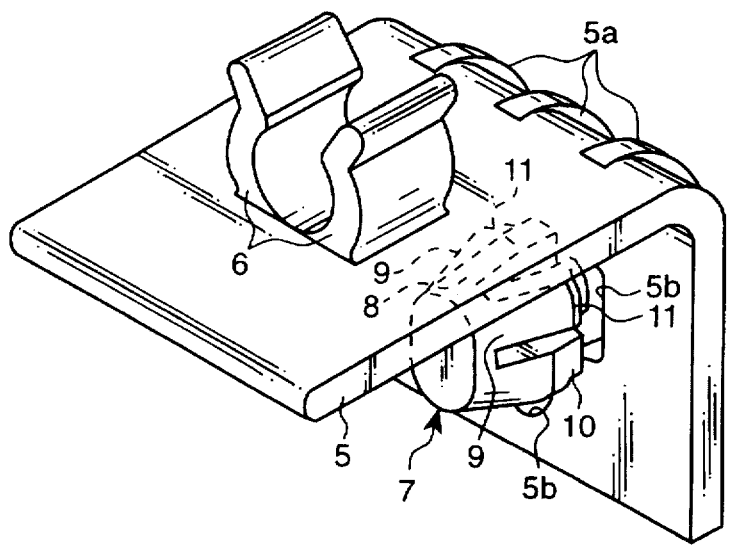
FIG. 4 is a perspective view showing another angle of the clamp of the present invention.

As shown in FIG. 2, a fixing or mounting plate 1 projects from a body of a vehicle, such as in an engine compartment. Plate 1 has a hole 2 which is formed with an oval shape.

Figure 1:
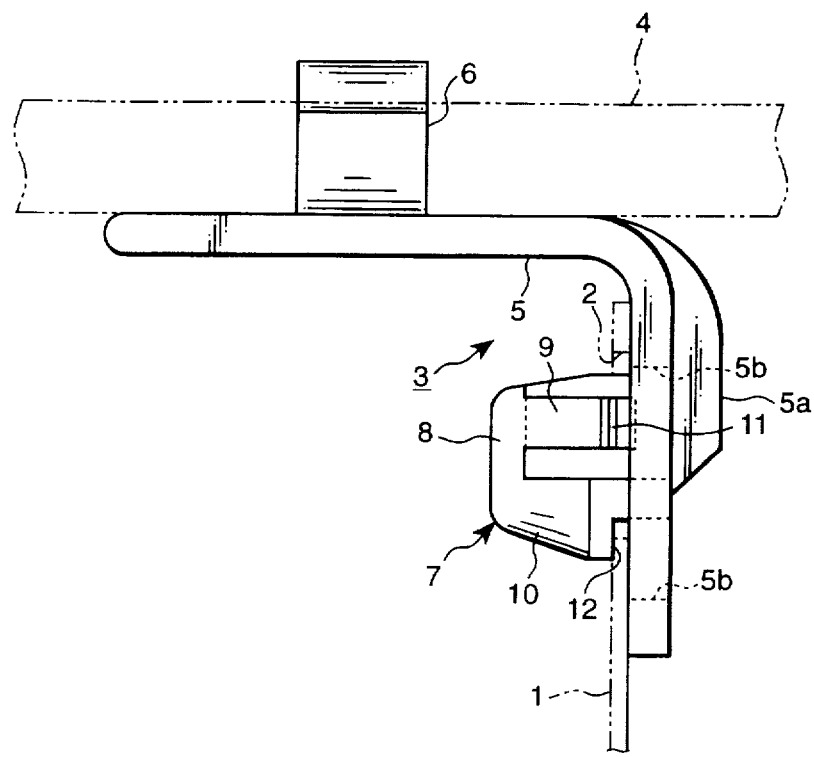
FIG. 1 is a side view showing a clamp as a fastener of the present invention.

As shown in FIG. 1, a vacuum hose 4, a longitudinal member, is to be installed on plate 1 through a clamp 3 as the fastener for fixing the longitudinal member in place. Clamp 3 is made of synthetic resin, such as, for example, polyacetal. Clamp 3 has a main body 5 formed with a reversed L-shape, in the side view, a pair of holding arms 6 for holding the vacuum hose 4, and a clip portion 7 for fixing to plate 1.

As shown in FIGS. 3 to 6, holding arms 6 are integrally formed with the main body 5 on the upper side at one end portion. Holding arms 6 are formed in a substantially arcuate interior shape to be similar to the outer circumference of the vacuum hose 4, in order to firmly hold the vacuum hose 4. Also, clip portion 7 is formed at the other end portion on the lower side portion, of the main body 5. Clip portion 7 projects from the main body 5 to the left side in FIGS. 3 and 4.

Further, a plurality of ribs 5a, such as, for example, the three shown, are integrally formed on the back surface of the main body 5. These ribs 5a reinforce the main body 5. Ribs 5a can also make placement of clip portion 7 into the hole 2 an easy task. Also, there are three holes 5b at the counter part for clip portion 7 on the main body 5 in order to make connected portions 11 and 12 which are disclosed below.

Next, a detailed description of clip portion 7 will be described.

Clip portion 7 has a center pillar 8 as a central support member which is integrally formed as a one piece unit with the main body 5. A pair of flexible retainers 9 extend outwardly from the upper portion of center pillar 8 and to both the right and left sides, respectively. A catcher 10 extends downwardly as the bottom portion of the center pillar 8.

Figure 5:
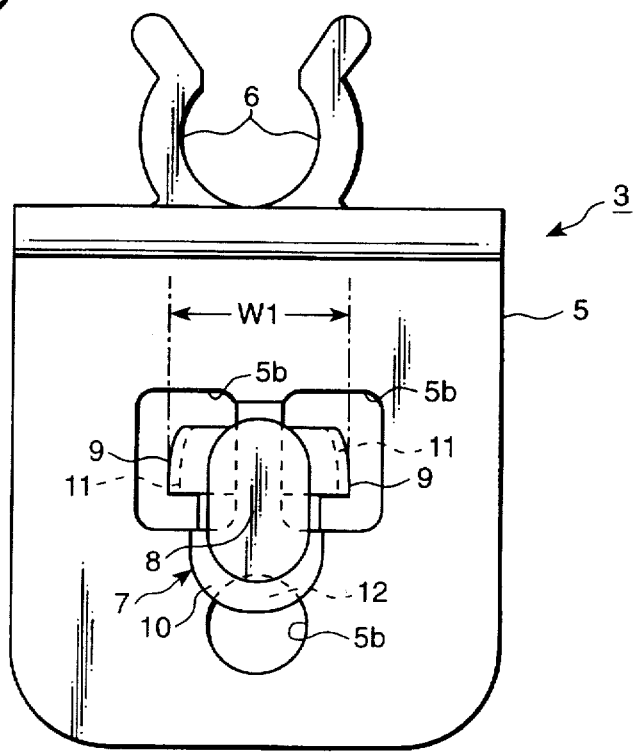
FIG. 5 is a back elevational view showing the clamp of the present invention.
Figure 6:
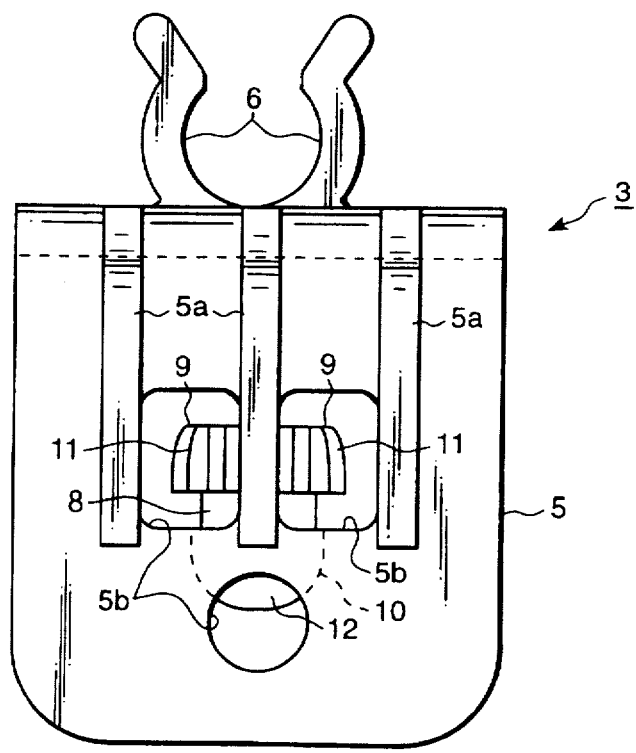
FIG. 6 is a front elevational view showing the clamp of the present invention.

In this case, as shown in FIGS. 2 and 5, the distance W1 between top portions of each flexible retainer 9, which is the maximum width, is wider than the width W2 of the hole 2 in plate 1. Also, the front end portion of each flexible retainer 9 can include a series of progressively recessed steps 11 or a single such step. These steps 11 will spring into contact with the edge of hole 2 as body 5 is pushed through. As each step 11 snaps in place, the retainers 9, which are initially compressed, are progressively released. See, for example, FIG. 8. Further, in this embodiment, each flexible retainer 9 has curved outer side surface, which permit them to slide easily along the circumferential edge of hole 2 when the clip portion 7 is pushed into hole 2.

Figure 7:
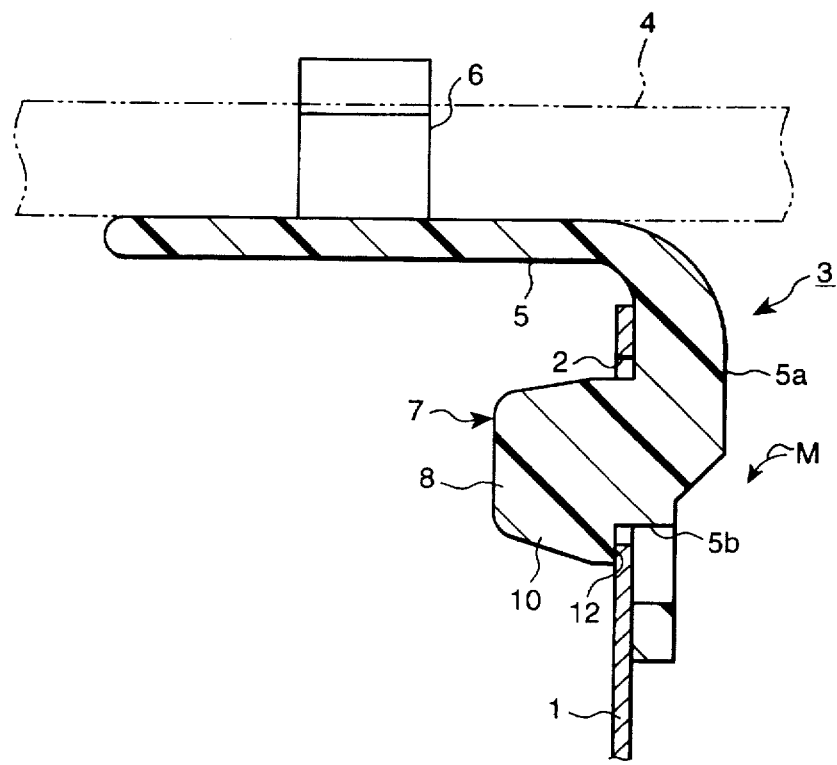
FIG. 7 is an elevational cross-sectional view showing the clamp of the present invention in the installation to the fixing plate.

A portion 12 of the catcher 10 is formed with a concavity, such as a groove, as shown in FIGS. 1 and 7 which defined the front end surface of the catcher 10 and the back a surface of the main body 5. Therefore, this area becomes a retaining portion or surface 12 and cooperates with the above connected step portions 11. Further, the catcher 10 is formed thicker than the flexible retainer 9. Therefore, the catcher 10 does not bend easily.

In use the clip portion 7 of the clamp 3 is first put into the hole 2 of plate 1. Consequently, the clamp 3 is fixed on the fixing plate 1. Also, the vacuum hose 4 is held between the holding arms 6 of the clamp 3. Therefore, the vacuum hose 4 is installed on the fixing plate 1 through the clamp 3.

Figure 8:
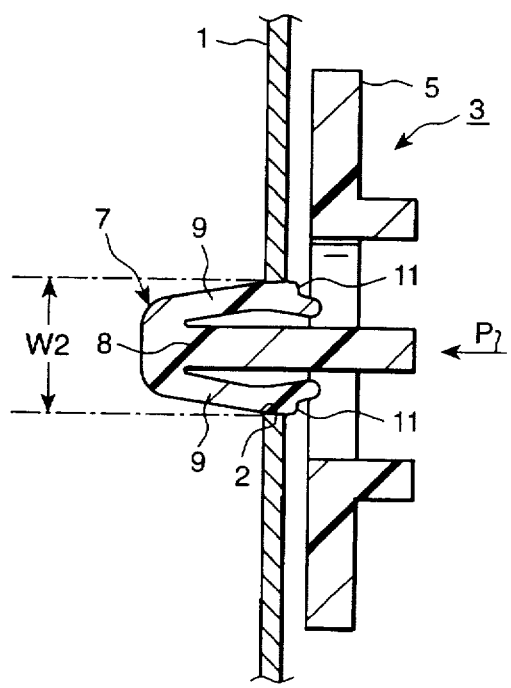
FIG. 8 is a partial horizontal cross-sectional view showing during the fixing of the clamp intone fixing plate of the present invention.

In this case, the clip portion 7 has a pair of flexible retainers 9 which extend from the upper portion of the center pillar 8 to right and left side directions, respectively. The distance W1 (the maximum width) between top portions of each flexible retainer 9 is wider than the width W2 of the hole 2. Therefore, as shown in FIG. 8, during the installation of the clip portion 7 in the direction indicated by arrow P, both flexible retainers 9 are initially bent inwardly.

Figure 9:
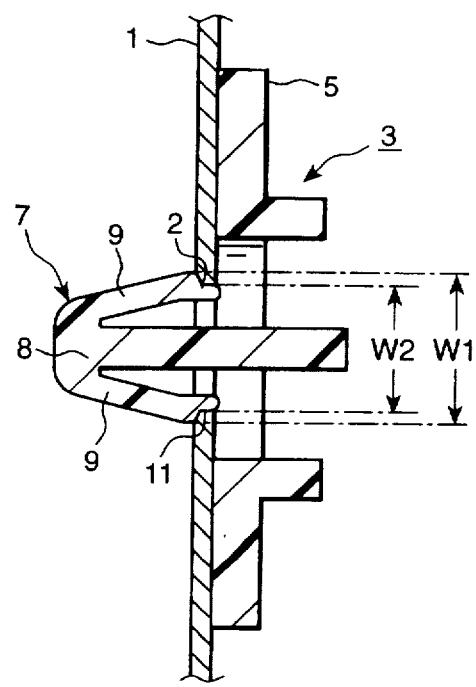
FIG. 9 is a partial horizontal cross-sectional view showing after the fixing of the clamp into the fixing plate of the present invention.
Figure 10:
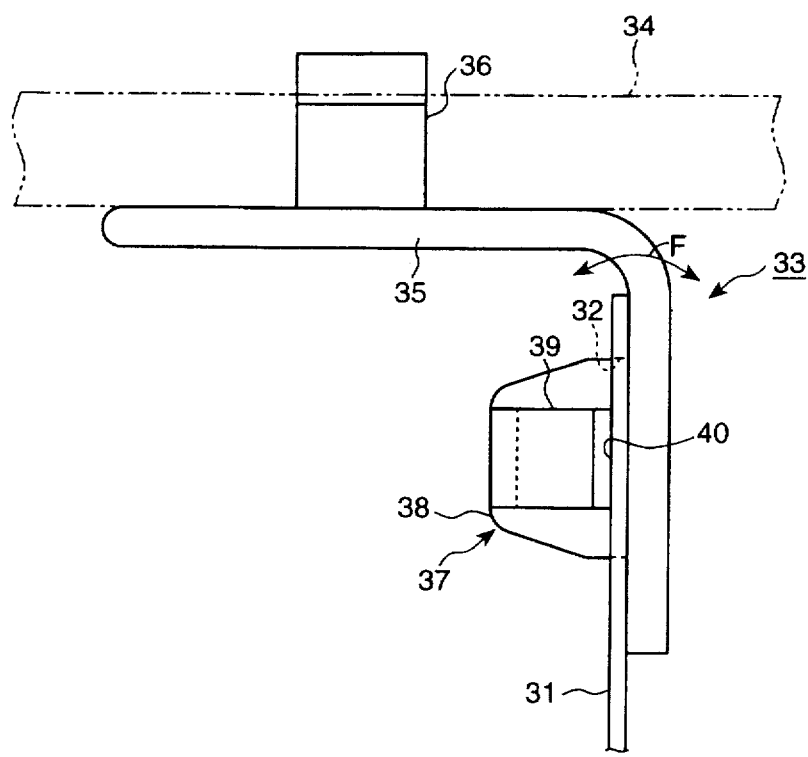
FIG. 10 is a side view showing a related art clamp as a fastener.
Figure 11:
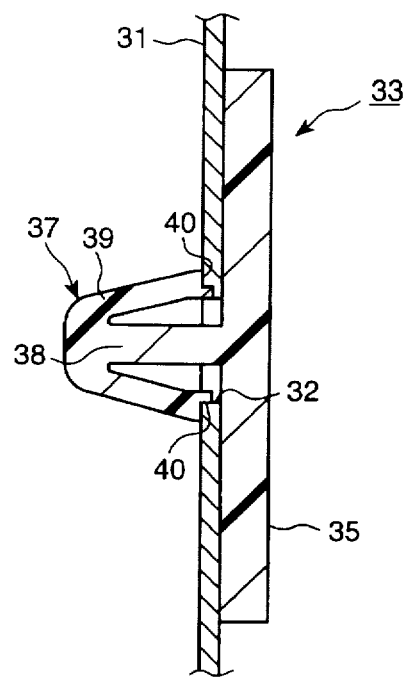
FIG. 11 is a partial horizontal cross-sectional view showing after the fixing of the clamp into the fixing plate of the related art.

As shown in FIG. 9, after the clip portion 7 is in hole 2, both flexible retainers 9 will spring back to their original condition. Then, the step or connection 11 of the flexible retainer 9 will contact the circumferential edge of the hole 2. Also, the hole 2 of the fixing plate 1 is formed to oval shape, and it is defined with an upper curved circumferential edge, a pair of parallel side edges and a lower curved circumferential edge. Therefore, the step or connection 11 will engage part of the curved circumferential edge of the hole and one of the parallel side edges, respectively.

Further, the clip portion 7 has the catcher 10 which extends as the lower portion of the center pillar 8. Catcher 10 includes a connection portion 12, which is formed like a groove, at the front end portion of it. Also, each flexible retainer 9 of the clip portion 7 has curved outer side surface. Therefore, when the clip portion 7 is put into the hole 2, the flexible retainers 9 can slide and move downwardly in the hole 2 along the curved outer side surface of the flexible retainers 9 and with the upper curved circumferential edge of the hole 2. That movement of the flexible retainers 9 occurs by their own elasticity.

Consequently, as shown in FIG. 7, the clip portion 7 can slide and move downwardly in accordance with above movement of the flexible retainers 9. The movement of the clip portion 7 is indicated arrow M in FIG. 7. Then, after the clip portion 7 is in hole 2, portion 12 contacts the lower curved circumferential edge of hole 2.

Consequently, the clip portion 7 connects to the hole 2 at these points, not only at the connection provided by steps 11 but also through the connection of portion 12. In this case, the connection of the hooked portions 11 are positioned adjacent the upper part and along both side edges of the hole 2. The connection of portion 12 is at the lower part of hole 2. Therefore, clip portion 7 is supported in a compact yet steady or secure position at the three points of the hole 2.

These points are not only at upper-and-lower side, but also along right-and-left side, of the hole 2.

Therefore, for example, during the installation of the vacuum hose 4, if the clamp 3 is received the above mentioned force F, the clamp 3 will remain fixed in place. Consequently, clamp 3 of this embodiment prevents being dislodged by a force F, and the clamp 3 is able to maintain its mounting stability.

Also, in this embodiment, hole 2 is formed with an oval shape, and it has at least the upper curved circumferential edge. Then, each flexible retainer 9 of the clip portion 7 is formed with a curved outer side surface. Therefore, when the clip portion 7 enters hole 2, clip portion 7 automatically slides and moves downwardly easily. Consequently, there is no need to move the clamp 3 downwardly to complete the connection.

While the hole 2 has an oval shape, the shape is not restricted to oval shape. However, it is desirable to have at least the upper curved circumferential edge as a round shape.

Also, ribs 5a and holes 5b are not essential and may be omitted.

The material of the fastener is not limited to polyacetal, but rather any thermoplastic resin can be used, such as polyamide, for example.

In accordance with the above embodiment, the curved outer side surface for sliding and guiding to downwardly of the clip portion is formed on each flexible retainer. However, the curved outer side surface for sliding and guiding to downwardly of the clip portion is formed on the upper surface of the center pillar.

Therefore, this invention produces the result of preventing loosening as a result of installation forces and being able to provide sufficient fixing stability.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A fastener for anchoring a holder to a support comprising:

a main body, including a holder;

a clip portion formed with and projecting from a surface on said main body, said clip portion having at least an upper curved circumferential edge;

said clip portion having a pair of flexible retainers each of which have a first connection portion, and a central member which has an unyieldable depending member having a support contacting face directed toward and spaced from said surface by a distance substantially equal to a thickness of said support so as to be slidable along said support, said support contacting face forming a second connection portion so that the clip portion will engage said support at three, spaced apart locations about a hole formed in said support.

2. The fastener as set forth in claim 1, wherein said clip portion has a center pillar which is integrally formed with said main body, and said pair of flexible retainers extending from opposite sides of said center pillar.

3. The fastener as set forth in claim 1, wherein said clip portion has a curved outer surface.

4. The fastener as set forth in claim 3, wherein a portion of said curved outer surface is formed by each of said flexible retainers.

5. The fastener as set forth in claim 4, wherein said clip portion can be slid through the said support hole and move vertically therein.

6. The fastener as set forth in claim 1, wherein said pair of flexible retainers are formed to define a substantially arcuate shape therebetween.

7. The fastener as set forth in claim 1, wherein a maximum width between said pair of flexible retainers is wider than a first width of said hole.

* * * * *